Dec. 20, 1927.

J. C. JEFFRIES

BAIT

Filed Aug. 16, 1926

1,653,400

John C. Jeffries
Inventor,

By C. A. Snow & Co.
Attorneys.

Patented Dec. 20, 1927.

1,653,400

UNITED STATES PATENT OFFICE.

JOHN C. JEFFRIES, OF ANGOLA, INDIANA.

BAIT.

Application filed August 16, 1926. Serial No. 129,558.

This invention aims to provide a bait of novel form, which will ride on the surface of the water, the bait creating a spray which will fall over the bait, novel means being provided for connecting the hook and the weed guard to the body of the bait.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
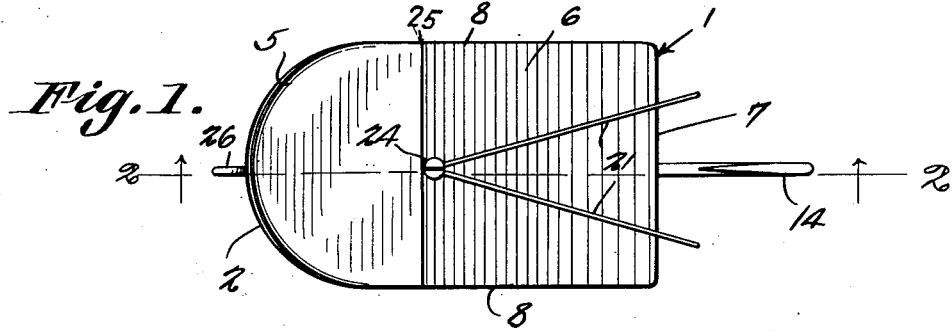
Figure 1 is a top plan of the bait.
Figure 2:
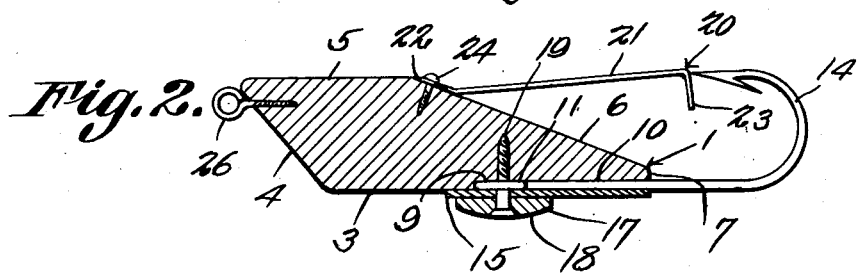
Figure 2 is a longitudinal section.
Figure 3:
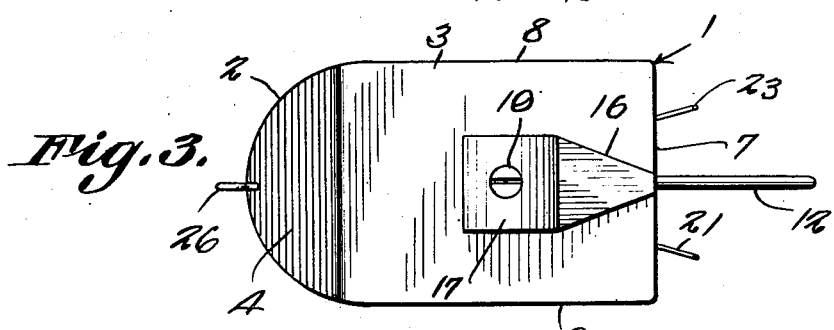
Figure 3 is a bottom plan.
Figure 4:
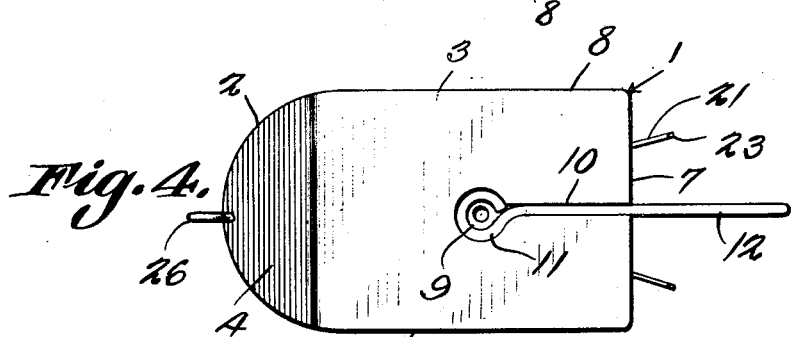
Figure 4 is a bottom plan wherein parts have been removed.

The bait forming the subject matter of this application includes a buoyant body 1 having a rounded forward end 2 when viewed in top plan. The body 1 has a flat lower face 3 and an upwardly inclined surface 4. The lower face 3 of the body 1 is located at the rear end of the body, and the flat forward upper face 5 being located at the front end of the body in parallel relation to the flat lower face 3, the flat lower face 3 being much longer than the upper surface 5. At the rear end of the upper surface 5, the surface 6 slants downwardly and rearwardly to the thinned rear end 7 of the body 1, the end 7 of the body being located at right angles to the sides 8, as the top plan view in the drawings will show.

A recess 9 is located in the lower face 3 of the body 1, and from the recess 9, a groove 10 extends backwardly through the rear end 7 of the body. The eye 11 on the shank 12 of a fish hook 14 is mounted in the recess 9, the shank 12 being seated in the groove 10, and the hook 14 extending upwardly and forwardly. The shank 12 of the fish hook 14 is held in the groove 10, and the eye 11 of the fish hook is held in the recess 9, by a cover plate 15, the rear end of which is tapered, as shown at 16. Against the cover plate 15 is placed a weight 17 which, preferably, is rounded off from front to back, on its lower surface, as shown at 18, so that it will ride readily through the water. A securing element, such as a screw 19 passes through the weight 17, through the cover plate 15, and through the eye 11 of the fish hook 14, to hold these parts assembled with the body 1.

The numeral 20 marks a weed guard including diverging arms 21, connected at their forward ends by an eye 22 and provided at their rear ends with depending fingers 23 located on opposite sides of the forwardly presented barb of the fish hook 14, in spaced relation to the barb of the hook. Through the eye 22 of the weed guard 20 extends a securing device 24, such as a screw, entering the body 1 and holding the weed guard on the body, the screw 24 being located near to the line 25 where the upper surface 5 merges into the rearwardly sloping upper surface 6. A towing device 26, such as an eye, is mounted on the forward end of the body 1, and is disposed vertically.

In practical operation, when the bait is drawn through the water, by means of a line, connected to the towing eye 26, the weight 17 keeps the bait in proper position in the water, with the flat lower face 3 down. The water strikes against the upwardly inclined surface 4 and is thrown into a spray which covers the entire bait, the spray being divided by the towing eye 26. The bait will skitter along over the top of the water and will be practically weedless, the guard 20 serving to disperse any weeds which may happen to slide over the top of the body 1. The operator at any time can take out the screw 19, thereby releasing the fish hook 14, so that one fish hook can be substituted for another.

When the body 1 is towed through the water by means of the eye 26, the eye divides the spray produced when the water strikes the surface 4, and the spray falls backwardly, covering the body, even though the body is moving over the surface of the water.

What is claimed is:—

1. In a device of the class described, a buoyant body having parallel upper and lower surfaces and inclined front and rear surfaces, all of said surfaces being flat, and the rear and lower surfaces being longer, respectively, than the front and upper surfaces, an attaching element at the forward end of the body, a hook on the rear end of the body and having an upwardly extended barb, and a weed guard mounted on the body and extended backwardly on each side of the hook.

2. In a device of the class described, a body provided in its lower surface with a recess and with a groove, a hook including a shank mounted in the groove, and an eye received in the recess, a weight, and a securing device passing through the weight and through the eye into the body and holding the weight and the hook on the body.

3. In a device of the class described, a body provided in its lower surface with a recess and with a groove, a hook including a shank located in the groove and an eye located in the recess, a plate covering the recess and the groove, a weight mounted on the plate, and a securing element passing through the weight, the plate and the eye of the hook, and extended into the body.

In testimony that I claim the foregoing as my own, I have hereto affixed my signature.

JOHN C. JEFFRIES.